US006494042B2

(12) United States Patent
Bronicki

(10) Patent No.: US 6,494,042 B2
(45) Date of Patent: Dec. 17, 2002

(54) METHOD OF AND APPARATUS FOR PRODUCING UNINTERRUPTIBLE POWER

(75) Inventor: Lucien Y. Bronicki, Yavne (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/780,672

(22) Filed: Feb. 12, 2001

(65) Prior Publication Data

US 2002/0108372 A1 Aug. 15, 2002

(51) Int. Cl.$^7$ ............................................. F01K 25/08
(52) U.S. Cl. .......................... 60/651; 60/646; 60/657; 60/671
(58) Field of Search ...................... 60/646, 651, 657, 60/671

(56) References Cited

U.S. PATENT DOCUMENTS

| | | | | |
|---|---|---|---|---|
| 4,235,077 A | * | 11/1980 | Bryant | 60/618 |
| 4,363,216 A | * | 12/1982 | Bronicki | 60/657 |
| 4,471,621 A | * | 9/1984 | Amir et al. | 60/657 |
| 4,558,228 A | * | 12/1985 | Larjola | 60/646 X |
| 5,329,771 A | * | 7/1994 | Kytomaki et al. | 60/657 |
| 6,125,625 A | * | 10/2000 | Lipinski et al. | 60/39.141 |
| 6,192,687 B1 | * | 2/2001 | Pinkerton et al. | 60/646 |

* cited by examiner

Primary Examiner—Hoang Nguyen
(74) Attorney, Agent, or Firm—Nath & Associates PLLC; Gary M. Nath; Jerald L. Meyer

(57) ABSTRACT

Apparatus for producing uninterruptible power upon loss of power from an electric grid, comprising at least one hot standby organic Rankine cycle turbine system including a vapor turbine and a generator for producing power upon loss of power from the electric grid; a control unit for sensing loss of power from the electric grid and activating the hot standby organic Rankine cycle turbine system; and means for rotating the turbine when power is available from the electric grid. In addition, a method for producing uninterruptible power upon loss of power from an electric grid, said method comprising the steps of: providing at least one hot organic Rankine cycle turbine system including a vapor turbine and a generator for producing power upon loss of power from the electric grid; sensing loss of power from the electric grid and activating the hot standby organic Rankine cycle turbine system; and rotating the turbine in the hot standby organic Rankine cycle turbine system when power is available from the electric grid.

37 Claims, 5 Drawing Sheets

US 6,494,042 B2

METHOD OF AND APPARATUS FOR PRODUCING UNINTERRUPTIBLE POWER

TECHNICAL FIELD

This invention relates to a method of and apparatus for producing power, and more particularly, to a method of and apparatus for producing uninterruptible power for communication systems such as communication systems that are also located in urban areas or in the vicinity of towns and also only stand alone systems.

BACKGROUND OF THE INVENTION

In systems provided for providing uninterruptible power particularly for communication systems several options have been available: photovoltaic systems, thermoelectric generators (TEG) or organic Rankine cycle energy converters (OEC). In addition, uninterruptible power sources (UPS) for short time periods as well as UPS's and diesel generators for long time use or diesel generators and a flywheel system.

In photovoltaic systems, batteries are used to compensate for the hours/days without solar radiation. Usually, the batteries are very large and, in most cases, the choice is for Nickel-Cadmium batteries. The reason is that the photovoltaic systems require batteries to work on deep discharge cycles, for which the Ni-Cad batteries are much better adapted than Lead Acid batteries. The problems are—very high cost for batteries and the need for maintenance of the batteries. In any case, in a 20-year project, the Ni-Cad batteries have to be replaced at least once. In telecommunication systems powered by photovoltaic cells need always batteries.

As far as thermoelectric generators (TEG) are concerned, since telecommunication equipment operates at varying load, and the TEG are continuously delivering full rated power, batteries are necessary for correcting the supply of power to the equipment. Moreover, the TEG requires use of dummy loads for dissipating the surplus of power delivered and not used by the telecommunications equipment. As TEG cannot trickle charge the batteries, additional battery chargers are required. If not, the battery will not be properly charged, and will require additional maintenance and manual charging during maintenance and the lifetime will decrease. The telecommunication systems powered by TEG always need batteries.

Turning to organic Rankine cycle energy converters (OEC), since they operate at varying load, they can trickle charge the batteries and thus increase their lifetime. In telecommunication systems, the OECs can be used in hot standby configuration. If one OEC fails, the second will deliver the full station load. The transient period until the second OEC will deliver the full load is of a few minutes (up to about 20–50 minutes) and could be reduced by either adding a very small standard battery to OECs to deliver a few AH during the transient period.

In a related system disclosed in U.S. Pat. No. 4,982,589, the disclosure of which is hereby incorporated by reference, a hybrid power plant is disclosed that includes an intermittently operable non-fuel consuming power generator, such as a photovoltaic cell array, or a wind generator, connected through a control-circuit to a battery for changing the same and for supplying current to a time-wise, substantially constant, electrical load. In addition, this hybrid power plant includes an electric generator connected to an intermittently operable prime mover, such as a Rankine cycle organic vapor turbogenerator, for charging the battery and supplying current to the electrical load when the prime mover is operated, and a sensor for sensing at least one electrical parameter of the power plant. With such an arrangement, the prime mover is operable only when the power generator is not operating.

Batteries are used in all the telecommunication projects to provide DC power to the telecom equipment and the reliability and availability of the system depends strongly on the battery characteristics.

The batteries have a limited lifetime and if not properly charged and maintained they have to be replaced a few times during the life of a project estimated as 20–25 years.

In addition, the battery condition cannot be correctly assessed, and it will normally fail without any kind of advance notice, thus causing shut down of the stations. Moreover, the battery fails when they are actually needed so that, when there is an electric grid power outage, the diesel generator fails when it is attempted to start it consequently causing the battery, UPS and diesel generator not to provide power.

It is therefore an object of the present invention to provide a new and improved method of and apparatus for providing uninterruptible power wherein the disadvantages as outlined are reduced or substantially overcome.

SUMMARY OF THE INVENTION

Apparatus for producing uninterruptible power according to the present invention comprises a hot standby organic Rankine cycle turbine system. No batteries are needed in the present invention. In one embodiment of the present invention apparatus for producing uninterruptible power according to the present invention includes a high-speed flywheel; and a single hot standby organic Rankine cycle turbine system. In another embodiment of the present invention apparatus for producing uninterruptible power according to the present invention includes two hot standby organic Rankine cycle turbine systems operating in parallel. In this embodiment both hot standby organic Rankine cycle turbine systems include a sonic nozzle for ensuring that the pressure in the boiler of the hot standby organic Rankine cycle turbine system operates at relatively high pressure. Furthermore in this embodiment one hot standby organic Rankine cycle turbine system includes a control valve for opening and closing in accordance with the output of the generator of the other hot standby organic Rankine cycle turbine system. In addition, here the other hot standby organic Rankine cycle turbine system also includes a control valve for opening and closing in accordance with the output of the generator of the other hot standby organic Rankine cycle turbine system. In this embodiment, the relatively high pressure of the boiler is suitable for producing full power output from the organic Rankine cycle turbine included in said hot standby organic Rankine cycle turbine system.

Furthermore in the embodiment of the present invention including a high-speed flywheel a motor is included for rotating the turbine when electric power is available from the electric grid. This embodiment also includes a heater comprising a burner for combusting fuel. In addition, the present embodiment includes an electric heater for heating to liquid organic working fluid when electric power is available from the electric grid. Moreover, in the present embodiment a three-way valve is included for supplying, when electric power is available from the electric grid, sufficient organic working fluid vapor for operation of the turbine bearings only.

In addition, the present invention includes a method for producing uninterruptible power and comprises the step of providing a hot standby organic Rankine cycle turbine system for producing uninterruptible power. In one embodiment of the method for producing uninterruptible power a high-speed flywheel is provided; and a hot standby organic Rankine cycle turbine system that produces power is provided. In a further embodiment of the method for producing uninterruptible power by providing a hot standby organic Rankine cycle turbine system two hot standby organic Rankine cycle turbine systems operating in parallel are provided. In this embodiment, relatively high pressure is maintained in the boiler of the hot standby organic Rankine cycle turbine system by using a sonic nozzle for supplying organic working fluid vapor to the organic turbine. Furthermore, in the present embodiment, a control valve is provided for supplying further working fluid vapor from the boiler to the organic turbine in response to a signal from the output of the generator of the other hot standby turbine when the output falls below a certain threshold such that the output of the first hot standby organic Rankine cycle turbine is substantially full power. In addition, in this embodiment relatively high pressure is maintained in the boiler of the other hot standby organic Rankine cycle turbine system by also using a sonic nozzle for supplying organic working fluid vapor-to the organic turbine of the other hot standby organic Rankine cycle turbine system. Moreover, in the present embodiment a control valve is provided for supplying further working fluid vapor from the boiler to the organic turbine contained in the other hot standby organic Rankine cycle turbine system in response to a signal from the output of the generator of the first hot standby turbine when the output falls below a certain threshold such that the output of the other hot standby organic Rankine cycle turbine is substantially full power. Additionally, in this embodiment, the relatively high pressure maintained in the boiler of the hot standby organic Rankine cycle turbine system is such that the relatively high pressure of the boiler is suitable for producing full power output from the organic Rankine cycle turbine included in said hot standby organic Rankine cycle turbine system.

Furthermore, in the embodiment of the method for producing uninterruptible power in which a high-speed flywheel; and a hot standby organic Rankine cycle turbine system that produces power are provided, an electric motor is operated for rotating the turbine when electric power is available from the electric grid. In this embodiment, sufficient organic working fluid vapor is supplied to the condenser for supplying organic working fluid condensate only to the bearings of the turbine when electric power is available from the electric grid. In addition, in the present embodiment, an electric heater is operated when electric power is available from the electric grid that heats the organic working fluid liquid present in a boiler such that sufficient organic working fluid vapor is produced for supplying organic working fluid condensate from the condenser only to the bearings of the turbine. Furthermore, in this embodiment, power is supplied to the electric grid using the high-speed flywheel when electric power is not available from the power grid. Moreover, in accordance with the present embodiment, organic working fluid vapor is supplied only to the nozzles of the turbine and the turbine is rotated using heat stored in the heated working fluid present in the boiler of the hot standby organic Rankine cycle turbine system when electric power is not available from the power grid. In addition, a burner for heating the organic working fluid liquid present in said boiler is switched on when electric power is not available from the power grid. Additionally, the electric heater is switched off when electric power is not available from the power grid.

BRIEF DESCRIPTION OF THE DRAWINGS

Embodiments of the present invention are described by way of example, and with reference to the accompanying drawings wherein.

Like reference numerals and designations in the various drawings refer to like elements.

DETAILED DESCRIPTION

Figure 1:
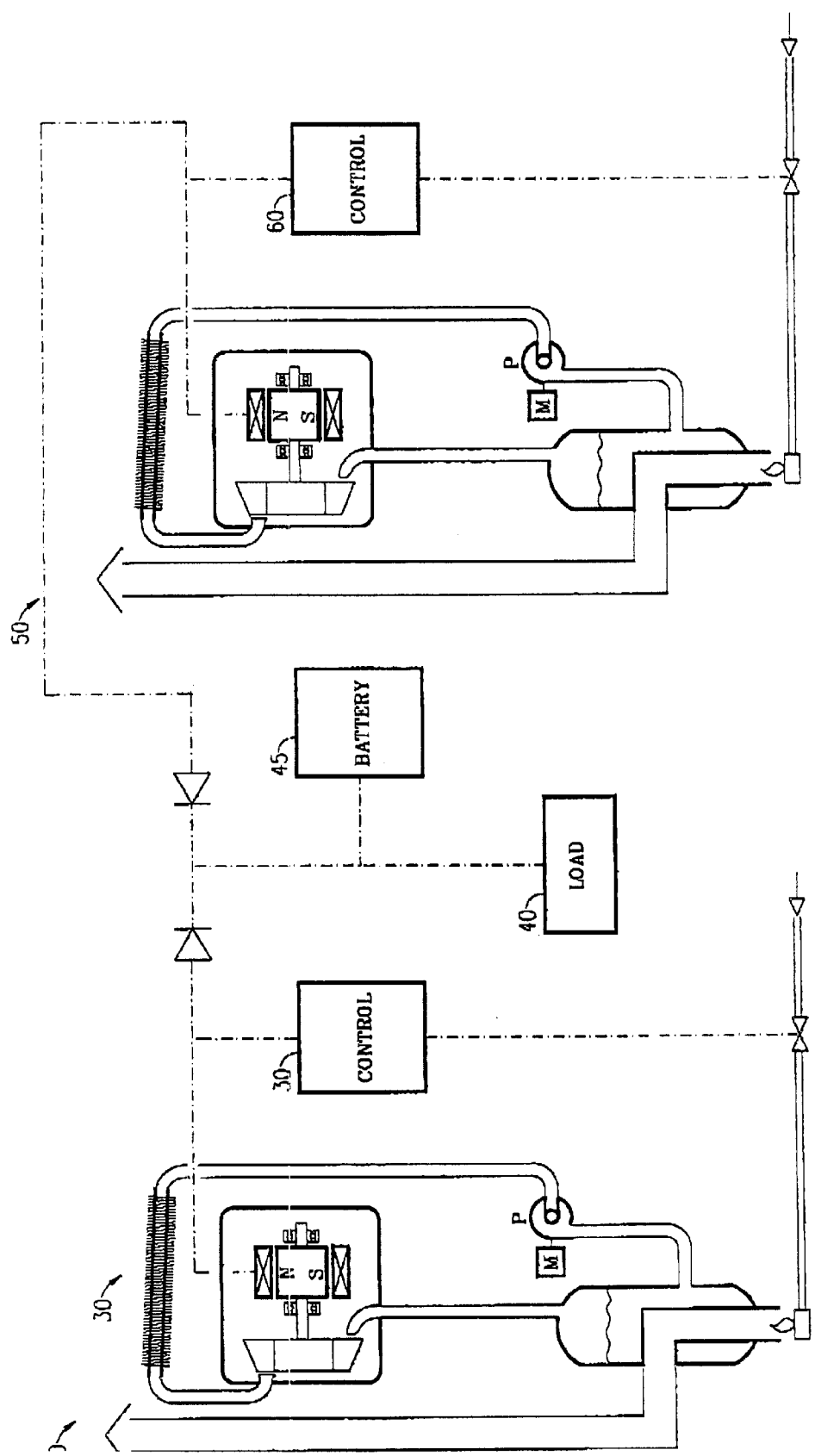
FIG. 1 is a schematic diagram of apparatus typical of the prior art.

Referring now to FIG. 1, reference numeral 10 designates a typical power producing station having a pair of organic Rankine cycle turbine systems 20 and 50. In this system, both organic Rankine cycle turbine systems ate provided and operate at half power or half load in order to provide extra reliability to the system. Thus, if, e.g., maintenance needs to be carried out to one of the systems 20 or 50, the other system can remain operating at full power or full load thus permitting the station to continue operating at full load capacity. Battery or batteries 40 are provided to permit the transfer from operation with both systems 20 and 50 operating to the operation of one system, system 20 or 50, with full load capacity still being maintained at the station.

Figure 2:
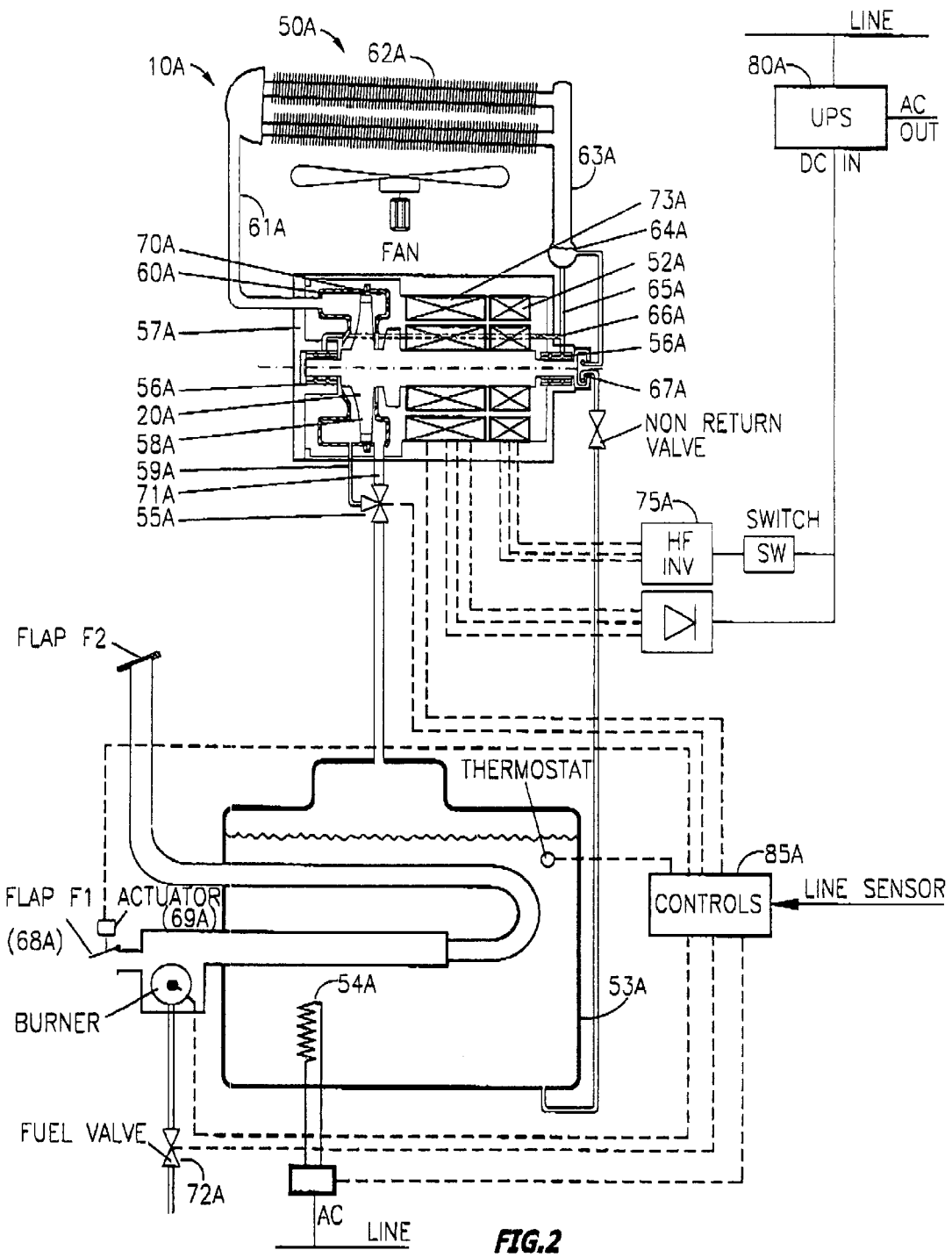
FIG. 2 is a schematic diagram of an embodiment of the present invention.

As far as FIG. 2 is concerned, power unit system 10A is provided according to an embodiment of the present invention for providing uninterruptible power and includes high-speed flywheel 20A and single hot standby organic Rankine cycle turbine system 50A. In the present embodiment, hot standby organic Rankine cycle turbine system 50A includes electric motor 52A for rotating the turbine when electric power is available from the electric grid. This embodiment also includes boiler 53A and heater 51A comprising e.g. a burner for combusting fuel. In addition, the present embodiment includes electric heater 54A for heating the liquid organic working fluid in the boiler when electric power is available from the electric grid. Moreover, in the present embodiment, three-way valve 55A is included that enables the supply, when electric power is available from the electric grid, of sufficient organic working fluid vapor only for operation of the bearings 56A of turbine 57A.

In operation, when the electric grid is supplying electric power, electric motor 52A rotates turbine wheel 58A of turbine 57A via inverter 75A that receives DC (bas) from uninterruptible power source (UPS) 80A. Three-way valve 55A receives sufficient organic working fluid vapor from boiler 53A, heated by electric heater 54A, for supplying fluid only to bearings 56A. Heater, i.e. burner, 51A is not operated and flap 68A is maintained in a closed state by actuator 69A. Thus, three-way valve 55A supplies organic working fluid vapor from boiler 53A via bleed conduit 58A to exhaust block 59A. These vapors are then supplied via conduit 61A to condenser 62A where they are cooled producing organic working fluid condensate. This condensate is supplied via conduit 63A, header 64A and conduits 65A and 66A to bearings 56A. Condensate exiting the bearings is supplied via pump 67A, e.g. a pitot pump, to a small reservoir from where it is returned to bearings 56A.

Electric heater 54A continues to supply heat to organic working fluid in boiler 53A for compensating for fluid finding its way back to boiler 53A.

When the electric grid does not supply electric power, power stored in flywheel 20A permits power unit 10A to continue to supply electric power even though no electric power is supplied to electric motor 52A from the electric grid. Three-way valve 55A os switched by control unit 85A, which senses the state of the line power, in order that organic working fluid vapor is supplied from boiler 53A via conduit 71A to turbine nozzle block 70A, with the supply of vapors via conduit 58A to exhaust block 59A being shut. Consequently, power is now produced by the rotation of turbine wheel 58A rotated by organic working fluid vapor produced by heat stored in the hot organic working fluid present in boiler 53A. At the same time, actuator 69A opens flap 68A and heater, i.e. burner, 51A commences operation with the receipt of a control signal from control unit 85A that also sends a control signal to open fuel valve 72A. In addition, control unit 85A sends a control signal to electric heater 54A to stop operation. The rotation of turbine wheel 58A results in generator 73A producing electric power.

When electric power becomes available from the electric grid once again, control 85A senses the electric power and sends control signals to heater, i.e. burner, 51A, to switch off, to flap 68A to close, to electric heater 58A to switch on and to three-way valve 55A to supply organic working fluid vapor only to exhaust block 60A for operation of the bearings 56A of turbine 57A.

Figure 3:
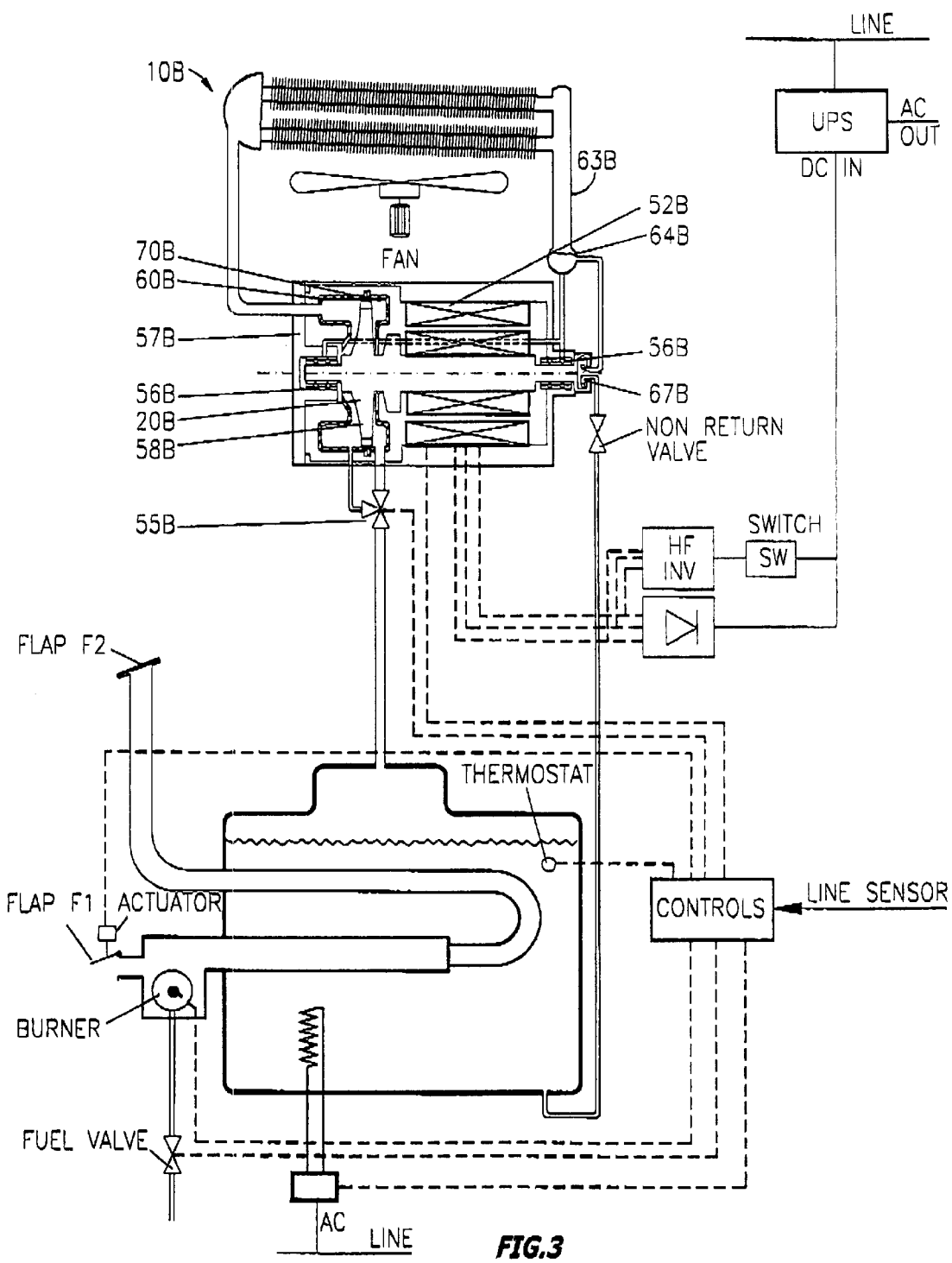
FIG. 3 is a schematic diagram of a modification of the embodiment of the present invention shown in FIG. 2.

Turning to FIG. 3, numeral 10B designates a further embodiment of a power unit system provided for supplying uninterruptible power in accordance to the present invention and comprises a power unit system very similar to the embodiment described with reference to FIG. 2. However, in the embodiment described with reference to FIG. 3, motor/generator 52B is included such that when electric power is available at the electric grid motor/generator 52B operates as a motor for rotating turbine 57B. On the other hand, when no electric power is available on the electric grid, motor/generator 52B operates as an electric generator in order that the rotation of turbine 57B results in motor/generator 52B producing electric power that can be supplied to the electric grid.

Figure 4:
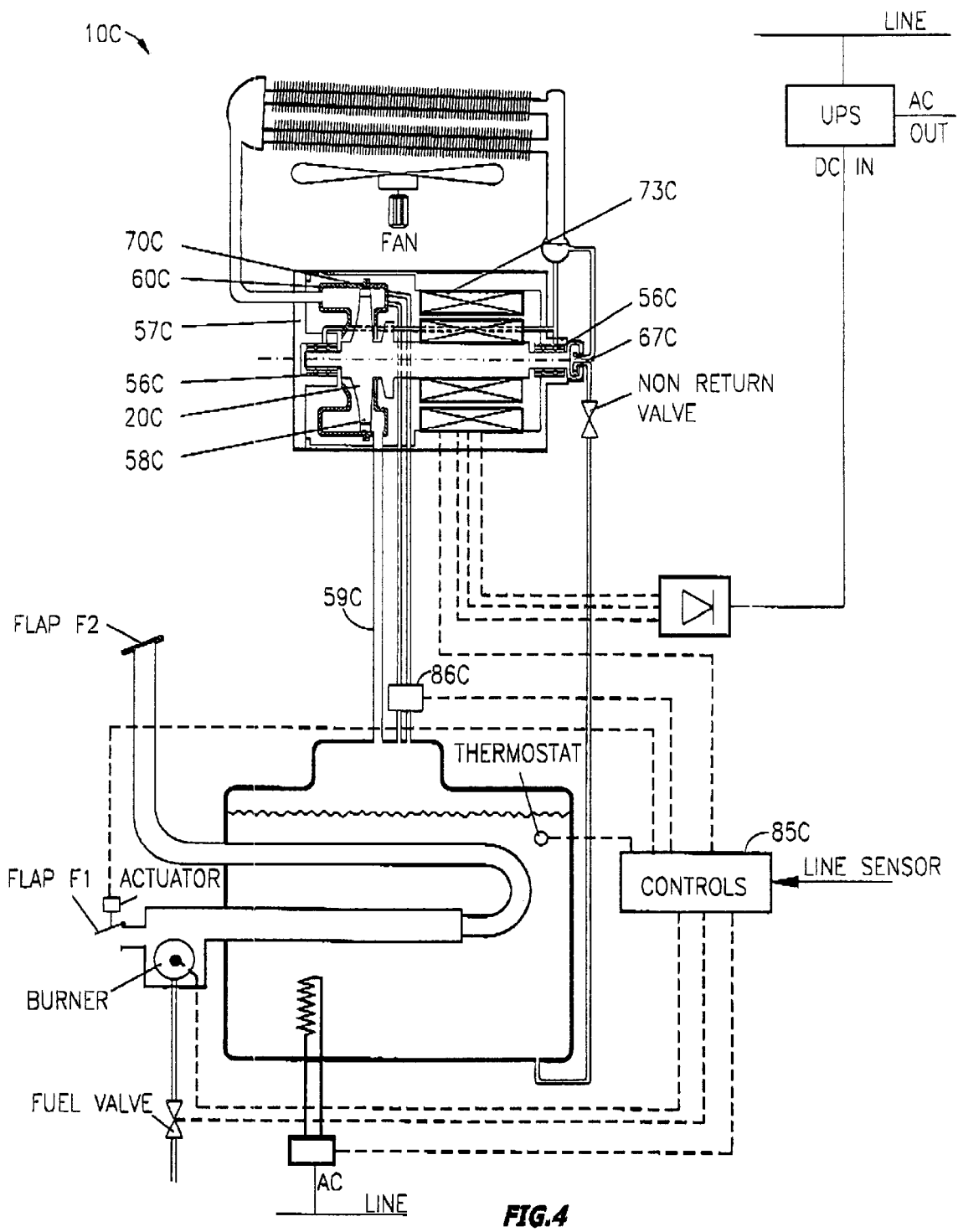
FIG. 4 is a schematic diagram of a further modification of the embodiment of the present invention shown in FIG. 2.

As far as FIG. 4 is concerned, numeral 10C designates an additional embodiment of the present invention for supplying uninterruptible power in accordance to the present invention. Also here, this embodiment is similar to the embodiment described with reference to FIG. 2 and in particular to the embodiment described with reference to FIG. 3. In the present embodiment rather than using three-way valve 55A or 55B as shown in FIGS. 2 and 3 respectively, conduit 59C feeds one turbine nozzle out of several or tens present in nozzle block 70C so that a few percent of the organic working fluid vapors are fed to turbine wheel 58C via conduit 59C for rotating it.

Consequently, when electric power is available at the electric grid, a small amount of organic working fluid vapor is supplied via conduit 59C and one nozzle of nozzle block 70C to turbine wheel 58C for rotating the turbine wheel. As a result, there is no need in this embodiment for an electric motor for rotating turbine wheel 58C when electric power is available from the electric grid. In addition, when no electric power is available on the electric grid, control valve 86C that receives control signals from control unit 85C supplies organic working fluid vapor to the rest of the nozzles in nozzle block 70C for rotating turbine wheel 58C at full power.

In these embodiments, if preferred, turbine wheel 58A, 58B and 58C can function as a flywheel such that flywheel 20A can be eliminated. Furthermore, electric generator 73A in FIG. 1 can be a synchronous, homopolar, induction or permanent magnet generator, while motor 52A can be an induction, synchronous or permanent magnet motor.

Thus, in these embodiments, the use of flywheel 20A, 20B and 20C or turbine wheel 58A, 58B and 58C operating as a flywheel, eliminates the need for using a battery or batteries.

Figure 5:
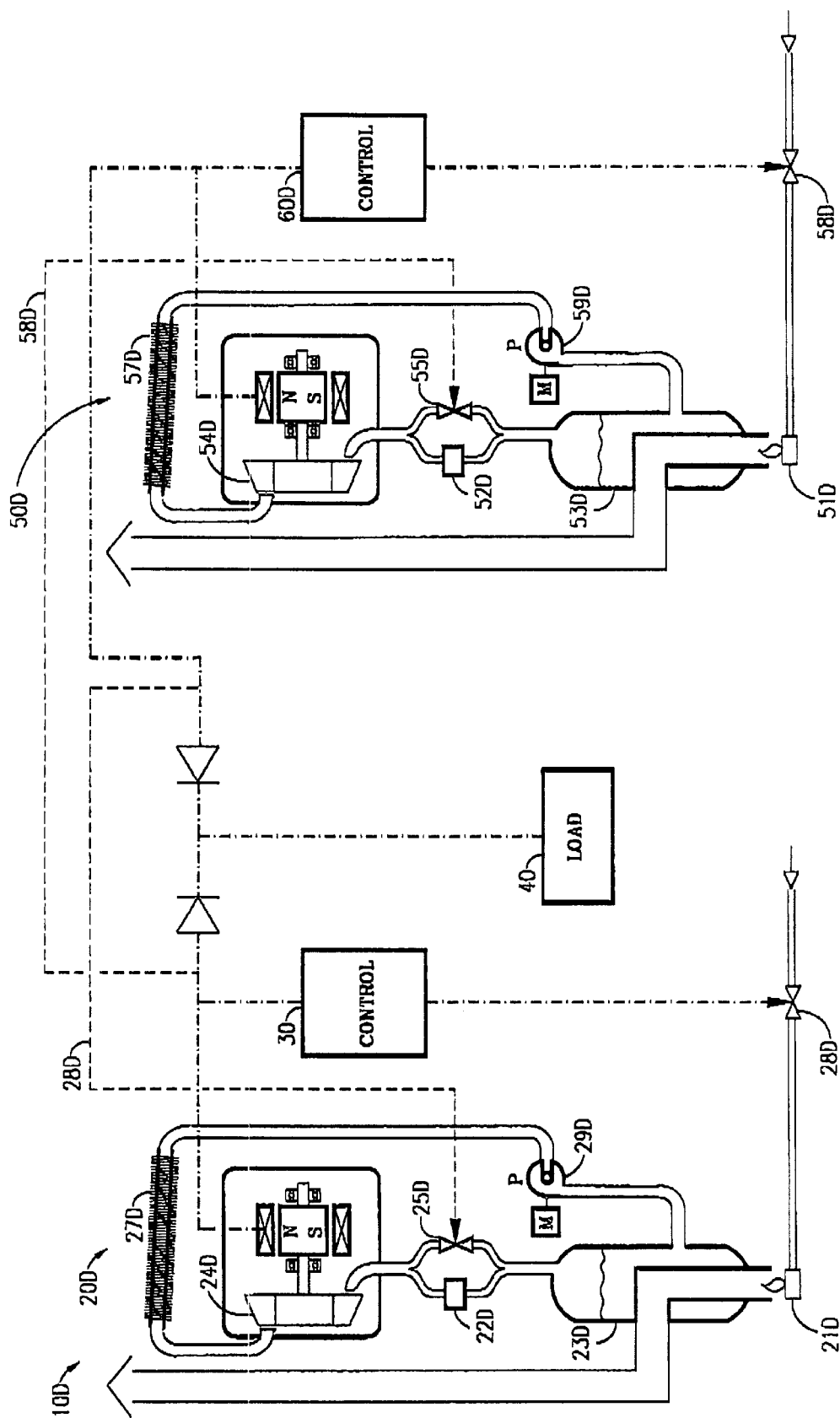
FIG. 5 is a schematic diagram of another embodiment of the present invention.

Turning to FIG. 5, power producing station 10D is provided in accordance with a still further embodiment of the present invention in order that uninterruptible power can be produced at all times. Organic Rankine cycle turbine systems 20D and 50D are provided in accordance with the present invention with sonic nozzles 22D and 52D respectively that permit the pressure in boilers 23D and 53D to be maintained at a relatively high pressure so that any one of systems 20D or 50D can quickly provide full power when needed. The pressure maintained in boilers 23D and 53D is substantially the pressure needed to operate either of organic turbine 24D and 54D at full power or full load capacity of load 40D. Each system 20D or 50D is also provided with control valve 25D and 55D respectively so that sufficient vapors can be supplied from boilers 23D and 53D to organic turbine 24D and 54D in order that the turbines whenever required can quickly produce full power.

In normal operation, organic Rankine cycle turbine systems 20D and 50D operate so that organic turbines 24D and 54D receive sufficient organic working fluid vapors from boilers 23D and 53D respectively via sonic nozzles 22D and 52D to drive electric generators 26D and 56D in order that each of them produce half power or half load capacity. As can be seen from FIG. 5, heat is supplied to boilers 23D and 53D by use of heaters 21D and 51D, for example burners, the operations of which are controlled by fuel valves 28D and 58D regulated by controls 30D and 60D respectively. Expanded organic working fluid exiting each organic turbine 24D and 54D is supplied to organic working fluid condensers 27D and 57D respectively so that organic working fluid condensate produced therein is supplied via, for example, pump 29D or 59D, to boilers 23D and 53D. When one of systems 20D and 50D begins to reduce its power output, control line 28D or 58D senses the drop in the power output of one of electric generators 26D or 56D and one of controls 30D or 60D supplies a control signal to one of control valves 25D and 55D so that these valves are opened. Consequently, sufficient organic working fluid is now supplied to one of organic turbines 24D and 54D so that one of electric generators 26D and 56D produces full power. Once the other organic Rankine cycle turbine system, either 20D or 50D returns to half power or half load capacity, line 28D or 58D senses the increase in the power output of the respective electric generator, 26D and 56D, and thus a control signal is supplied by control 30D or 60D to the respective control valve, 25D and 55D, so that this valve is now closed ensuring that only sufficient organic working fluid vapor is supplied to the respective organic turbine 24D and 54D in order that half power or half load capacity is now produced by the organic turbine.

Thus, according to the embodiment of the present invention described with reference to FIG. 5, due to the pressure of high pressure in boilers 23D and 53D, no battery or batteries are needed or necessary in the operation of this embodiment.

Furthermore, it should be pointed out that the present invention includes as well the method for operating the apparatus disclosed with reference to above-described figures.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. Apparatus for producing uninterruptible power upon loss of power from an electric grid, said apparatus comprising:
    a) at least one hot standby organic Rankine cycle turbine system including a vapor turbine and a generator for producing power upon loss of power from said electric grid;
    b) a control unit for sensing loss of power from said electric grid and activating said hot standby organic Rankine cycle turbine system; and
    c) means for rotating said turbine when power is available from said electric grid.

2. Apparatus according to claim 1 wherein a turbine wheel of said vapor turbine act as a high-speed flywheel.

3. Apparatus according to claim 1 wherein said hot organic Rankine cycle turbine system includes two hot standby organic Rankine cycle turbine systems operating in parallel, each of said hot standby organic Rankine cycle turbine systems having a vapor turbine, a generator and a control valve for controlling the output of its generator such that one of the hot standby organic Rankine cycle turbine systems produces full power upon loss of power of the other hot standby organic Rankine cycle turbine system.

4. Apparatus according to claim 3 wherein at least one of said both hot standby Rankine cycle turbine systems include a sonic nozzle for ensuring that the pressure in a boiler of the hot standby organic Rankine cycle turbine system operates at relatively high pressure.

5. Apparatus according to claim 4 wherein one hot standby organic Rankine cycle turbine system includes a control valve for opening and closing in accordance with the output of the generator of the other hot standby organic Rankine cycle turbine system.

6. Apparatus according to claim 5 wherein the other hot standby organic Rankine cycle turbine system also includes a control valve for opening and closing in accordance with the output of the generator of the other hot standby organic Rankine cycle turbine system.

7. Apparatus according to claim 4 wherein said relatively high pressure of the boiler is suitable for producing full power output from said vapor turbine.

8. Apparatus according to claim 2, wherein each of said hot standby organic Rankine cycle turbine systems further comprises:
    a) a boiler for producing organic working fluid vapors from heat supplied to liquid organic working fluid present in said boiler;
    b) a heater for supplying said heat to said liquid organic working fluid in said boiler;
    c) said vapor turbine receiving and expanding said organic working fluid vapors and producing power and expanded organic working fluid vapor;
    d) a condenser for receiving and condensing said expanded working fluid vapor and thereby producing working fluid condensate; and
    e) means for returning said organic working fluid condensate to said boiler.

9. Apparatus according to claim 8 wherein said heater comprises an electric heater for heating said liquid organic working fluid when electric power is available from the electric grid.

10. Apparatus according to claim 9 including a burner for combusting fuel that is switched on and operates once no electric power is available from the electric grid for ensuring the lubrication of said bearings.

11. Apparatus according to claim 8 including a three-way valve for supplying, when electric power is available from the grid, sufficient organic working fluid vapor to said vapor turbine for operation of the turbine bearings.

12. Apparatus according to claim 8 further comprising means for ensuring the supply of sufficient organic working fluid condensate only to the bearings of said vapor turbine included in the hot standby organic Rankine cycle system when electric power is available from the electric grid, thereby ensuring the lubrication of said bearings.

13. Apparatus according to claim 8 wherein said means for returning said organic working fluid condensate to said boiler comprises a pump.

14. Apparatus according to claim 12 wherein a pump is included in said means for ensuring the supply of sufficient organic working fluid only to the bearings of said vapor turbine included in the hot standby organic Rankine cycle turbine system when electric power is available from the electric grid to ensure lubrication of said bearings.

15. A method for producing uninterruptible power upon loss of power from an electric grid, said method comprising the steps of:
    a) providing at least one hot organic Rankine cycle turbine system including a vapor turbine and a generator for producing power upon loss of power from said electric grid;
    b) sensing loss of power from said electric grid and activating said hot standby organic Rankine cycle turbine system; and
    c) rotating said turbine in said hot standby organic Rankine cycle turbine system when power is available from said electric grid.

16. A method according to claim 15 including the step of providing a turbine wheel of said vapor turbine included in said organic Rankine cycle turbine system that acts as a high-speed flywheel.

17. The method according to claim 15 wherein the step of providing a hot standby organic Rankine cycle turbine system includes providing two hot standby organic Rankine cycle turbine systems operating in parallel, each of said hot standby organic Rankine cycle turbine systems having a vapor turbine, a generator and a control valve for controlling the output of its generator such that one of the hot standby organic Rankine cycle turbine systems produces full power upon loss of power of the other hot standby organic Rankine cycle turbine system.

18. A method according to claim 17 including maintaining relatively high pressure in the boiler of the hot standby organic Rankine cycle turbine system by using a sonic nozzle for supplying organic working fluid vapor to the organic turbine.

19. The method according to claim 18 including supplying further working fluid vapor from the boiler to the vapor turbine using a control valve in response to a signal from the output of the generator of the other hot standby turbine when said output falls below a certain threshold such that the output of the first hot standby organic Rankine cycle turbine is full power.

20. The method according to claim 18 including maintaining relatively high pressure in the boiler of the other hot standby organic Rankine cycle turbine system by supplying organic working fluid vapor to the vapor turbine of the other hot standby organic Rankine cycle turbine system by using a sonic nozzle.

21. The method according to claim 20 including supplying further working fluid vapor from the boiler to the vapor turbine using a control valve in response to a signal from the output of the generator of the other hot standby turbine when said output falls below a certain threshold such that the output of the first hot standby organic Rankine cycle turbine is full power.

22. A method according to claim 18 wherein the step of maintaining relatively high pressure in the boiler of the hot standby organic Rankine cycle turbine system is such that the relatively high pressure of the boiler is suitable for producing full power output from the organic Rankine cycle turbine included in said hot standby organic Rankine cycle turbine system.

23. The method according to claim 15 further comprising the steps of:
   a) supplying heat to liquid organic working fluid in a boiler, thereby producing organic working fluid vapors;
   b) expanding said organic working fluid vapors in said vapor turbine, thereby producing power and expanded organic working fluid vapor;
   c) condensing said expanded working fluid vapor in a condenser and producing organic working fluid condensate; and
   d) returning said organic working fluid condensate to said boiler.

24. The method according to claim 15 wherein the step of rotating said turbine when power is available from said electric grid is accomplished using an electrical motor.

25. The method according to claim 23 including ensuring the supply of sufficient organic working fluid only to the bearings of said turbine when electric power is available from the electric grid for ensuring the lubrication of said bearings.

26. The method according to claim 23 including operating an electric heater when electric power is available from the electric grid, said electric heater heating the liquid organic working fluid present in the boiler such that sufficient organic working fluid heat is supplied to said liquid present in the boiler ensuring the supply of sufficient organic working fluid to the bearings of the vapor turbine included in said organic Rankine cycle turbine system for ensuring the lubrication of said bearings when electric power is available from the electric grid.

27. The method according to claim 15 wherein the step of rotating said turbine when power is available from said electric grid is accomplished by supplying a sufficient amount of organic working fluid vapor to rotate said vapor turbine by using a single nozzle to supply said organic working fluid vapor.

28. The method according to claim 27 including supplying organic working fluid vapor only to nozzles of said vapor turbine and rotating said vapor turbine using heat present in the heated working fluid in the boiler of the hot standby organic Rankine cycle turbine system when electric power is not available from the power grid.

29. The method according to claim 23 wherein the step of providing at least one hot organic Rankine cycle turbine system includes providing an electric heater for maintaining said at least one hot organic Rankine cycle turbine system in hot standby when electric power is available from the electric grid.

30. The method according to claim 29 including switching on and operating a burner for heating the liquid organic working fluid present in said boiler once electric power is not available from the electric grid.

31. The method according to claim 30 including switching off the electric heater for maintaining said at least one hot organic Rankine cycle turbine system in hot standby when electric power is not available from the electric grid.

32. The method according to claim 30 including the step of providing a flap positioned on the stack through which combustion gases exit said boiler.

33. The method according to claim 32 including opening said flap when switching on and operating said burner for heating the liquid organic working fluid present in said boiler once electric power is not available from the electric grid and closing said flap while said at least one hot organic Rankine cycle turbine system is in hot standby when electric power is not available from the electric grid.

34. The method according to claim 22 wherein said step of returning said organic working fluid condensate to said boiler is carried out by pumping said organic working fluid condensate to said boiler.

35. The method according to claim 25 including the step of providing a pump for ensuring the supply of sufficient organic working fluid only to the bearings of said vapor turbine included in the hot organic Rankine cycle turbine system when electric power is available from the electric grid to ensure lubrication of said bearings.

36. Apparatus according to claim 1, wherein said means for rotating said turbine when power is available from said electric grid comprises an electric motor.

37. Apparatus according to claim 1, wherein said means for rotating said turbine when power is available from said electric grid comprises a single nozzle for supplying a sufficient amount of organic working fluid vapor to rotate said vapor turbine.

* * * * *